United States Patent
Long et al.

(10) Patent No.: US 8,310,939 B2
(45) Date of Patent: Nov. 13, 2012

(54) METHOD, SYSTEM, AND DEVICE FOR CONFIGURING OPERATION, ADMINISTRATION AND MAINTENANCE PROPERTIES

(75) Inventors: Hao Long, Shenzhen (CN); Jianhua Gao, Shenzhen (CN); Don Li, Shenzhen (CN); Jixiong Dong, Shenzhen (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 331 days.

(21) Appl. No.: 12/690,212

(22) Filed: Jan. 20, 2010

(65) Prior Publication Data

US 2010/0118708 A1 May 13, 2010

Related U.S. Application Data

(63) Continuation of application No. PCT/CN2008/071778, filed on Jul. 28, 2008.

(30) Foreign Application Priority Data

Jul. 27, 2007 (CN) .......................... 2007 1 0128955

(51) Int. Cl.
*G01R 31/08* (2006.01)
*G06F 11/00* (2006.01)
*G08C 15/00* (2006.01)

(52) U.S. Cl. ...................................... 370/241
(58) Field of Classification Search .................... 370/241
See application file for complete search history.

(56) References Cited

U.S. PATENT DOCUMENTS

2004/0073659 A1  4/2004  Rajsic et al.
2006/0007867 A1*  1/2006  Elie-Dit-Cosaque et al. .......................... 370/241.1
2006/0133284 A1  6/2006  Elie-Dit-Cosaque et al.
2006/0262728 A1  11/2006  Addeo et al.
2007/0014290 A1*  1/2007  Dec et al. ...................... 370/390

FOREIGN PATENT DOCUMENTS

| CN | 1531252 A | 9/2004 |
| CN | 1728651 A | 2/2006 |
| CN | 1794662 A | 6/2006 |
| CN | 1870504 A | 11/2006 |
| EP | 1 615 377 A1 | 1/2006 |
| EP | 1 675 303 A1 | 6/2006 |
| EP | 1 727 316 A1 | 11/2006 |
| WO | WO 03/094443 A1 | 11/2003 |

OTHER PUBLICATIONS

First Office Action, issued by Chinese Patent Office, dated Apr. 26, 2011, in Chinese Patent Application No. 200710128955.5, (9 pages).
Communication pursuant to Article 94(3) EPC, issued by European Patent Office, dated May 19, 2011, in European Patent Application No. 08 783 771.2-2416 (8 pages).

(Continued)

*Primary Examiner* — Mark Rinehart
*Assistant Examiner* — Maharishi Khirodhar
(74) *Attorney, Agent, or Firm* — Finnegan, Henderson, Farabow, Garrett & Dunner, LLP

(57) ABSTRACT

A method for configuring operation, administration and maintenance (OAM) properties, a system for configuring OAM properties, and a node device are provided. The method includes: delivering a message carrying OAM property configuration indicating information; and flowing through a plurality of nodes to be configured in the process of delivering the message, and configuring, by each of the nodes to be configured, an OAM property of the present node according to the OAM property configuration indicating information in the message flowing through the present node.

16 Claims, 3 Drawing Sheets

OTHER PUBLICATIONS

Supplementary European Search Report dated (mailed) Aug. 9, 2010, issued in related Application No. 08783771.2-2416, PCT/CN2008071778. filed Jul. 28, 2008 Hauwei Technologies Co., Ltd. (11 pages).

Written Opinion of the International Searching Authority (translation) dated (mailed) Nov. 6, 2008, issued in related Application No. PCT/CN2008/071778, filed Jul. 28, 2008, Huawei Technologies C., LTD (4 pages).

A. Takacs et al. GMPLS RSVP-TE Extension to Control Ethernet OAM Draft-takacs-ccamp-rsvp-te-eth-oam-ext-01, Network Working Group, Internet draft, Intended status Standards Track, Exp. Aug. 28, 2008, 22 pages).

Dinesh Mohan Nortel Networks Canada, ITU-T Draft Study Period 2005-2008, Study group 13, TD 57 (WP 4/13), Editor Y.1731 (Y.17ethoam), English only, Geneva, Jan. 16-27, 2006. (74 pages).

IEEE P802.1ag/D7.1, Draft Standard for Local and Metropolitan Area Networks, Virtual Bridge Local Area Networks—Amendments 5: Connectivity Fault Management, Lan Man Standards Committee of the IEEE Computer Society. Nov. 7, 2006, (231 pages).

International Search Report from P.R. China in International Application No. PCT/CN2008/071778 mailed Nov. 6, 2008.

* cited by examiner

METHOD, SYSTEM, AND DEVICE FOR CONFIGURING OPERATION, ADMINISTRATION AND MAINTENANCE PROPERTIES

CROSS-REFERENCE TO RELATED APPLICATIONS

This application is a continuation of International Application No. PCT/CN2008/071778, filed on Jul. 28, 2008, which claims priority to Chinese Patent Application No. 200710128955.5, filed on Jul. 27, 2007, both of which are hereby incorporated by reference in their entireties.

FIELD OF THE TECHNOLOGY

The present invention relates to the field of data communication technology, and more particularly to a method, a system, and a device for configuring operation, administration and maintenance (OAM) properties.

BACKGROUND OF THE INVENTION

With the development of the Ethernet towards a carrier-grade Ethernet, since an OAM function was added to the Ethernet technology system as an important characteristic of a carrier-grade network, the Ethernet OAM has also become an essential feature of the carrier-grade Ethernet.

FIG. 1 is a schematic view of maintenance domains (MDs) of the Ethernet OAM in the prior art. One Ethernet OAM architecture may include MDs at different levels and may also include multiple MDs at the same level. The MD is a network domain for implementing the OAM function. The Ethernet OAM architecture as shown in the figure includes a customer domain, a provider domain, and several network operator domains, for example, operation domains A, B, and C.

The same end-to-end connection may involve multiple MDs at different levels. For each connection, OAM property information such as an MD endpoint, an MD intermediate point, and an MD level, needs to be configured for each MD involved in the connection. In the prior art, the OAM property of each node needs to be configured by a network manager manually. As a result, if a large number of connections exist in the domain or an end-to-end connection involves a large number of nodes, the network manager has a large configuration task load and needs to configure a corresponding OAM property for each node to be configured. It can be seen that, the existing method for configuring OAM properties has a low efficiency.

SUMMARY

The present invention is directed to a method, a system, and a device for configuring OAM properties, capable of realizing automatic configuration for each node so as to improve the configuration efficiency of the OAM property.

In an embodiment, the present invention provides a method for configuring OAM properties, which includes: delivering a message carrying OAM property configuration indicating information; and flowing through a plurality of nodes to be configured in the process of delivering the message, and configuring, by each of the nodes to be configured, an OAM property of the present node according to the OAM property configuration indicating information in the message flowing through the present node.

In an embodiment, the present invention further provides a method for configuring OAM properties, which includes the following steps.

A message carrying OAM property configuration indicating information and flowing through a present node is processed, and the processing includes receiving the message carrying the OAM property configuration indicating information from a forward node and/or delivering the message carrying the OAM property configuration indicating information to a backward node according to a specified path.

An OAM property of the present node is configured according to the OAM property configuration indicating information.

In an embodiment, the present invention further provides a system for configuring OAM properties, which includes a plurality of nodes to be configured. A message carrying OAM property configuration indicating information flows through the plurality of nodes to be configured in turn. Each of the nodes to be configured is adapted to configure an OAM property of the present node according to the OAM property configuration indicating information in the message flowing through the present node.

In an embodiment, the present invention further provides a node device for configuring OAM properties, which includes a message processing unit and an OAM property configuration unit. The message processing unit is configured to process a message carrying OAM property configuration indicating information and flowing through a present node, and the processing includes receiving the message carrying the OAM property configuration indicating information from a forward node and/or delivering the message carrying the OAM property configuration indicating information to a backward node according to a specified path. The OAM property configuration unit is adapted to configure an OAM property of the present node according to the OAM property configuration indicating information.

As can be seen from the above technical solutions, in the embodiments of the present invention, a message carrying OAM property configuration indicating information is delivered, such that the message flows through nodes to be configured, and thus each node to be configured can configure an OAM property of the present node according to the OAM property configuration indicating information in the message. That is to say, each node to be configured can configure the OAM property of the present node automatically without requiring a network manager to perform configuration for the nodes to be configured one by one respectively.

DETAILED DESCRIPTION OF THE EMBODIMENTS

The embodiments of the present invention are illustrated in detail below with reference to the accompanying drawings. It should be noted that, OAM is currently a universal statement in the industry, but sometimes is also referred to as connection fault management (CFM). For the consistency of description, they are collectively referred to as OAM in the embodiments of the present invention.

Figure 1:
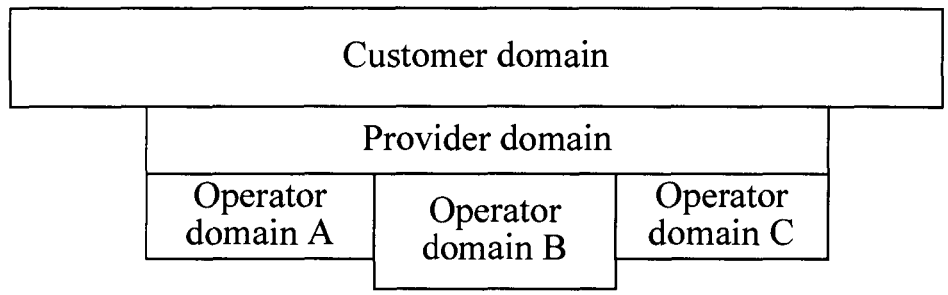
FIG. 1 is a schematic view of MDs of the Ethernet OAM in the prior art.
Figure 2:
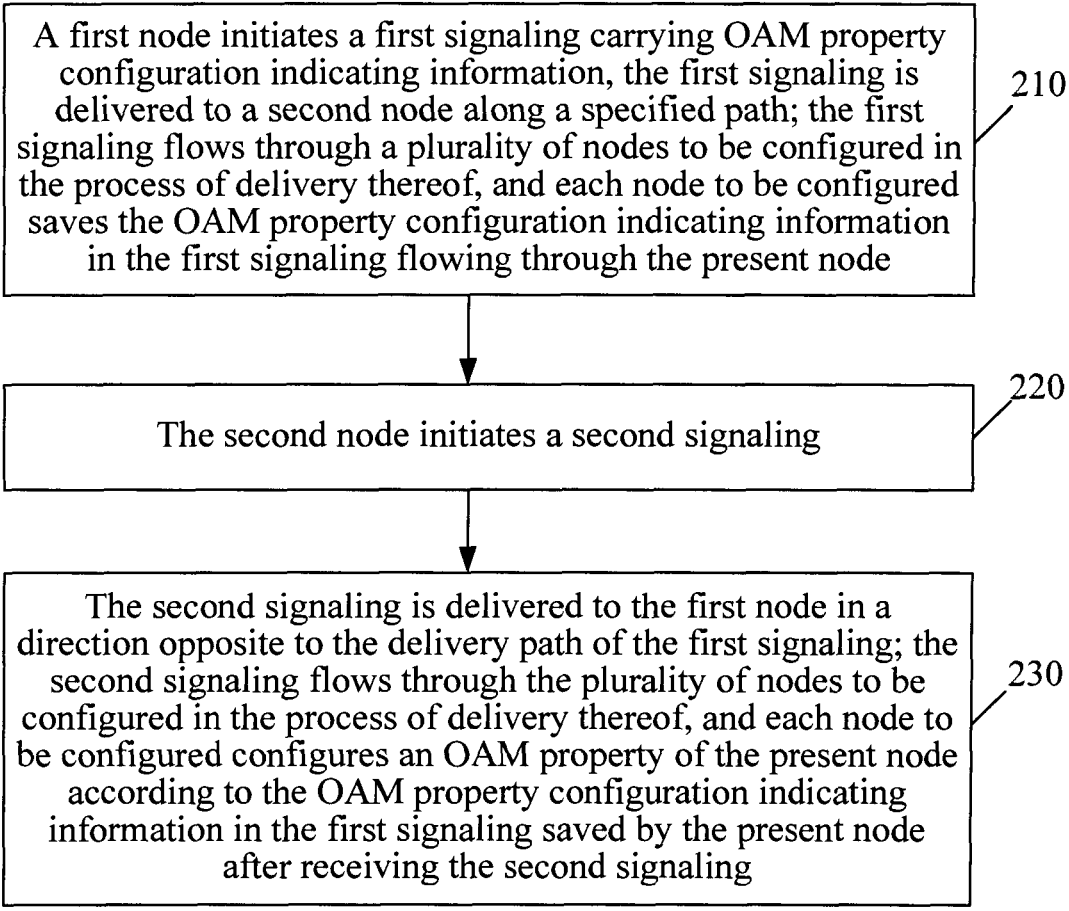
FIG. 2 is a flow chart of a method for configuring OAM properties according to a first embodiment of the present invention.

Referring to FIG. 2, a flow chart of a method for configuring OAM properties according to a first embodiment of the present invention is shown.

In Step 210, a first node initiates a first signaling carrying OAM property configuration indicating information, the first signaling is delivered to a second node along a specified path; the first signaling flows through a plurality of nodes to be configured in the process of delivery thereof, and each node to be configured saves the OAM property configuration indicating information in the first signaling flowing through the present node. The plurality of nodes to be configured may include only the first node and the second node, only an intermediate node of the specified path, or not only the first node and the second node but also the intermediate node of the specified path.

In Step 220, the second node initiates a second signaling after receiving the first signaling.

In Step 230, the second signaling is delivered to the first node in a direction opposite to the delivery path of the first signaling; the second signaling flows through the plurality of nodes to be configured in the process of delivery thereof, and each node to be configured configures an OAM property of the present node according to the OAM property configuration indicating information in the first signaling saved by the present node after receiving the second signaling. Thereby, when the delivery of the second signaling is finished (that is, the second signaling is delivered back to the first node), each node to be configured has automatically configured the OAM property of the present node.

The OAM property configuration indicating information in the first signaling includes, but not limited to, universal maintenance information of the nodes to be configured, distinctive maintenance information of the nodes to be configured, and addresses of nodes to be configured which the distinctive maintenance information relates to. The configuring, by each node to be configured, an OAM property of the present node according to the OAM property configuration indicating information in the first signaling saved by the present node specifically includes: configuring, by each node to be configured, distinctive maintenance information corresponding to the present node and universal maintenance information required by the present node according to the OAM property configuration indicating information in the first signaling flowing through the present node.

Maintenance information in different standards has different names and classifications, and is not limited in the embodiments of the present invention. Maintenance information in two currently universal standards is taken as an example merely for illustration below.

First Type

The universal maintenance information of the nodes to be configured includes, but not limited to, an MD name, a maintenance association (MA) name, and an MD level. The distinctive maintenance information of the nodes to be configured includes, but not limited to, identifiers (IDs) of MA endpoints. The addresses of nodes to be configured which the distinctive maintenance information relates to are addresses of nodes that the MA endpoints belong to. Certainly, the distinctive maintenance information of the nodes to be configured may also be IDs of MD intermediate points, and then correspondingly, the addresses of nodes to be configured which the distinctive maintenance information relates to are addresses of nodes that the MD intermediate points belong to.

When the distinctive maintenance information of the nodes to be configured in the first signaling is IDs of MA endpoints and the addresses of nodes to be configured which the distinctive maintenance information relates to are addresses of nodes that the MA endpoints belong to, if the node to be configured finds out that the addresses of nodes that the MA endpoints belong to in the saved first signaling contains an address of the present node after receiving the second signaling, the node to be configured configures a port on the present node as an MA endpoint and configures a corresponding MA endpoint ID as well as an MD name, an MA name, and an MD level; otherwise, the node to be configured configures a port on the present node as an MD intermediate point and configures an MD level.

Second Type

The universal maintenance information of the nodes to be configured includes, but not limited to, a maintenance entity group (MEG) ID and an MEG level. The distinctive maintenance information of the nodes to be configured includes, but not limited to, IDs of MEG endpoints (MEPs). The addresses of nodes to be configured which the distinctive maintenance information relates to are addresses of nodes that the MEPs belong to. Certainly, the distinctive maintenance information of the nodes to be configured may also be IDs of MEG intermediate points (MIPs), and then correspondingly, the addresses of nodes to be configured which the distinctive maintenance information relates to are addresses of nodes that the MIPs belong to.

When the distinctive maintenance information of the nodes to be configured in the first signaling is IDs of MEPs, and the addresses of nodes to be configured which the distinctive maintenance information relates to are addresses of nodes that the MEPs belong to, if the node to be configured finds out that the addresses of nodes that the MEPs belong to in the saved first signaling contains an address of the present node after receiving the second signaling, the node to be configured configures a port on the present node as an MEP and configures a corresponding MEP ID as well as an MEG ID and an MEG level; otherwise, the node to be configured configures a port on the present node as an MIP and configures an MEG level.

It should be noted that, generally speaking, in one connection, a source (a corresponding port on a source node of the connection) and a sink (a corresponding port on a sink node of the connection) are configured as MEPs, and a delivered signaling usually contains routing information indicating a delivery path of the signaling, so that a node receiving the signaling can know whether the present node is the source node, the sink node, or an intermediate node of the connection according to the routing information. Thus, in the above case, if the plurality of nodes to be configured described in this embodiment is a plurality of nodes to be configured on the same connection, the OAM property configuration indicating information in the first signaling may also not include the addresses of nodes which the distinctive maintenance information relates to, and each node determines a position of the present node on the connection according to the routing information in the signaling (for example, the first signaling or the second signaling), and then configures corresponding distinctive maintenance information. For example, the distinctive maintenance information is two MEP IDs on one connection, in which it may be specified that the first represents an ID of an MEP corresponding to a source node and the second represents an ID of an MEP corresponding to a sink node. Thereby, it is known through the routing information that the present node is a node of the sink node of the connection, so a corresponding port on the present node may be configured as an MEP and the second MEP ID may be allocated to the port.

If the plurality of nodes to be configured is not a plurality of nodes to be configured on the same connection, and each node to be configured cannot determine a property of a corresponding port on the present node (for example, whether it is an MEP or MIP) through the routing information in the signaling, the OAM property configuration indicating information needs to include an IP address of a node that each MEP belongs to.

Figure 3:
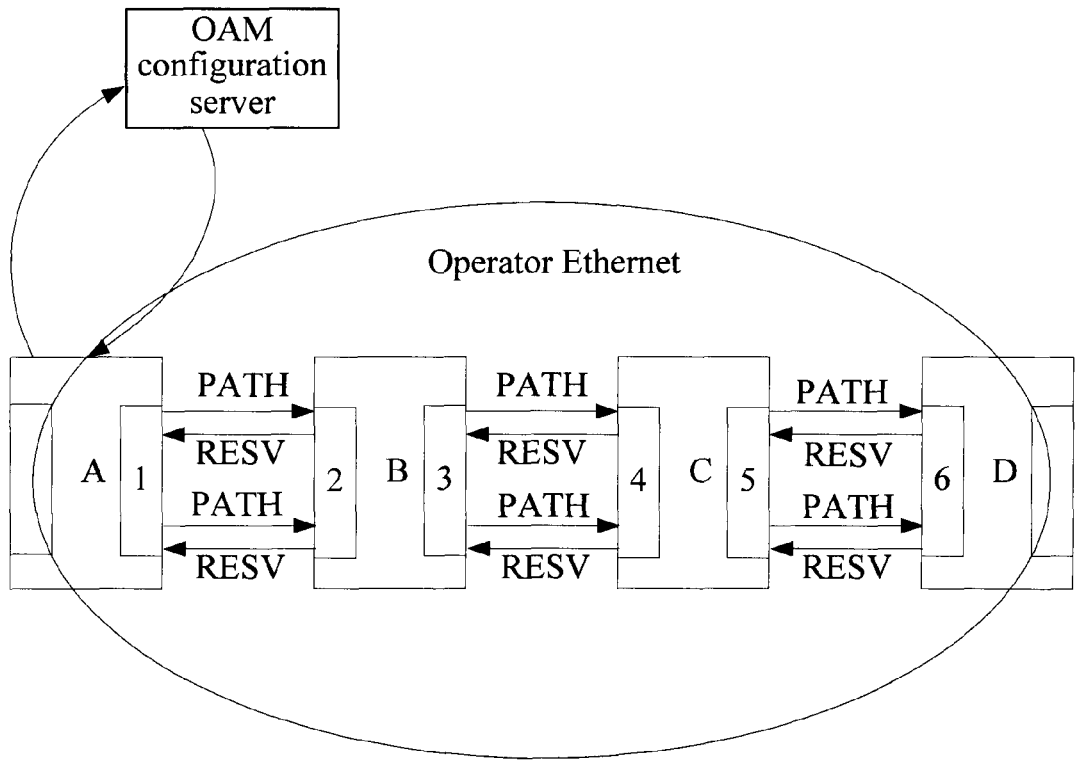
FIG. 3 is a schematic view illustrating principles of a specific implementation corresponding to the first embodiment descried in FIG. 2.

In order to understand the above process of automatically configuring the OAM property in more detail, a specific implementation corresponding thereto is given below. FIG. 3 is a schematic view illustrating principles of a specific implementation corresponding to the first embodiment shown in FIG. 2.

In this specific implementation, one Ethernet domain of an operator includes four nodes, namely, A, B, C, and D, in which A and D are provider edge (PE) nodes and B and C are intermediate nodes. Port 1 on node A and port 6 on node D are MEPs, ports 2 and 3 on node B and ports 4 and 5 on node C are MIPs. The network further includes an OAM configuration server configured to process an OAM configuration request (OAM_Configuration_Request).

(1) The operator initiates a connection request to request the setup of an Ethernet switching path (ESP) on A→D (a specified path). A PATH signaling is sent out by the node A as a signaling initiating point. The PATH signaling flows through the nodes B and C and then is delivered to the node D.

(2) After receiving the PATH signaling, the node D returns a RESV (ReserVation) signaling in a direction opposite to the delivery path of the PATH signaling. That is, the RESV signaling starts out from the node D, flows through the nodes C and B, and then is delivered to the node A. Upon receiving the RESV signaling, each node configures a forwarding table of the present node according to label information carried in the RESV signaling.

(3) Node A receives the RESV signaling, which indicates that the connection (that is, the ESP) is set up successfully. At this time, an OAM_Configuration_Request is triggered. Further, the node A sends an OAM_Configuration_Request message to the OAM configuration server to require the OAM configuration server to provide corresponding OAM property configuration indicating information. The OAM_Configuration_Request message carries ID information of the current ESP such that the OAM configuration server knows OAM properties of which nodes to be configured are requested at this time.

(4) After receiving the OAM_Configuration_Request message of the node A, the OAM configuration server returns to the node A an OAM configuration reply (OAM_Configuration_Reply) message containing universal maintenance information of the nodes to be configured, corresponding ESP IDs, and other information. The universal maintenance information of the nodes to be configured includes the same maintenance information applicable to all nodes to be configured, for example, an MEG ID and an MEG level.

(5) After receiving the OAM_Configuration_Reply message, the node A serves as a current primary node for allocating distinctive maintenance information of the nodes to be configured, and is responsible for allocating the distinctive maintenance information of the nodes to be configured, for example, IDs of all MEPs that the ESP relates to. In the allocation of the distinctive maintenance information, the node A needs to maintain the uniqueness of each MEP ID.

It should be noted that, the distinctive maintenance information of the nodes to be configured may also be provided directly by the OAM configuration server, that is, the OAM_Configuration_Reply message carries not only the universal maintenance information but also the distinctive maintenance information. In this way, the node A does not need to allocate by itself the distinctive maintenance information to the nodes to be configured.

(6) The node A initiates a new PATH signaling (corresponding to the first signaling in the first embodiment), which carries the universal maintenance information of the nodes to be configured obtained from the configuration server, the distinctive maintenance information allocated by node A, and addresses of nodes to be configured which the distinctive maintenance information relates to. The above information carried in the PATH signaling may be collectively referred to as OAM property configuration indicating information.

Taking the nodes shown in FIG. 3 as an example, the nodes to be configured are nodes A, B, C, and D, the universal maintenance information of the nodes to be configured is the MEG ID and the MEG level, the distinctive maintenance information is two MEP IDs, and the addresses of nodes to be configured which the distinctive maintenance information relates to are an IP address of the node A and an IP address of the node D respectively.

(7) The PATH signaling carrying the OAM property configuration indicating information is delivered from the node A to the node D through the nodes B and C. In this process, the nodes A, B, C, and D save OAM property configuration indicating information in the PATH signaling flowing through the present node in turn.

(8) After receiving the PATH signaling carrying the OAM property configuration indicating information, the node D returns a RESV signaling. Then, the RESV signaling carrying the OAM property configuration indicating information is delivered from the node D to the node A through the nodes C and B. In the process of delivering the RESV signaling, the nodes D, C, B, and A configure OAM properties of the present node in turn. The process in which each node configures the OAM property is specifically described below.

Firstly, the node D configures an OAM property of the present node according to the OAM property configuration indicating information carried in the saved PATH signaling, and delivers the RESV signaling to the node C. After receiving the RESV signaling, the node D finds out that the IP addresses of nodes that the two MEPs belong to in the OAM property configuration indicating information previously saved in the process of delivering the first signaling include an IP address of the present node, so it configures the port 6 (that is, the port receiving the PATH signaling) as an MEP and allocates an MEP ID corresponding to the IP address of the present node to the MEP. In addition, the node D further configures universal maintenance information, for example, an MEG ID and an MEG level, for the port. Up to now, the node D has finished the OAM property configuration of the present node.

Secondly, after receiving the RESV signaling from the node D, the node C finds out that the IP addresses of nodes the two MEPs belong to that are previously saved in the process of delivering the first signaling do not include an IP address of the present node, so it knows that the present node is an MIP, and then configures ports 4 and 5 thereon as MIPs. In addition, the node C may further configure universal maintenance information, for example, an MEG level, of ports on the present node. Up to now, the node C has finished the OAM property configuration of the present node.

The node C further continues to deliver the RESV signaling to the node B.

Thirdly, after receiving the RESV signaling from the node C, the node B finds out that the IP addresses of nodes the two MEPs belong to that are previously saved in the process of delivering the first signaling do not include an IP address of the present node, so it knows that the present node is an intermediate node, and then configures ports 2 and 3 thereon as MIPs. In addition, the node B further configures universal maintenance information, for example, an MEG level, of ports on the present node. Up to now, the node B has finished the OAM property configuration of the present node.

The node B further continues to deliver the RESV signaling to the node A.

Finally, after receiving the RESV signaling from the node B, the node A finds out that the IP addresses of nodes the two MEPs belong to that are previously saved in the process of delivering the first signaling include an IP address of the present node, so it configures port 1 (that is, the port receiving the RESV signaling) as an MEP and allocates an MEP ID corresponding to the IP address of the present node to the MEP. In addition, the node A further configures universal maintenance information, for example, an MEG ID and an MEG level, for the port. Up to now, the node A has finished the OAM property configuration of the present node.

As can be seen from the above process, the PATH signaling carrying the OAM property configuration indicating information flows through the nodes A, B, C, and D to be configured in turn in the process of delivery, each node to be configured may save the OAM property configuration indicating information carried in the PATH signaling flowing through the present node, and then configures the OAM property of the present node according to the previously saved OAM property configuration indicating information after receiving the RESV signaling delivered back in the opposite direction. When the delivery of the RESV signaling is finished, the above four nodes to be configured have all finished configuring respective OAM properties.

It can be seen that, in the specific implementation of the method for configuring OAM properties shown in this embodiment, a network manager does not need to send a network manager command to each node and perform OAM property configuration of each node respectively; instead, only a message carrying OAM property configuration indicating information needs to be delivered between the nodes to be configured, so as to realize the automatic OAM property configuration of a plurality of nodes. Therefore, the configuration efficiency is improved and the task load for the network manager to configure the OAM properties is reduced.

Alternative solutions of the specific implementation shown in FIG. 3 are illustrated in the following points.

First, the successful setup of an ESP is not a precondition of triggering the delivery of a message (such as a PATH signaling) carrying OAM property configuration indicating information. For example, the message carrying OAM property configuration indicating information may be delivered at the same time when the ESP is set up. For example, OAM property configuration indicating information may be directly carried in the PATH signaling initiating a connection setup request in the specific implementation (1), and then the OAM property configuration of each node to be configured is finished in the process of returning a RESV signaling by the node D. In the process of delivering the RESV signaling, each node the RESV signaling flows through not only creates a forwarding table of the present node but also configures an OAM property of the present node. Thus, this alternative solution realizes the OAM property configuration at the same time when the ESP is set up.

Second, the node A may need not request required OAM property configuration indicating information from the OAM configuration server; instead, the network manager directly configures the OAM property configuration indicating information on the node A.

Third, the OAM property configuration indicating information in the PATH signaling may not include IP addresses of nodes the two MEPs belong to respectively; the nodes D and A can know that the present nodes are a sink node and a source node according to the routing information in the PATH signaling, so as to configure corresponding ports thereon as MEPs and allocate corresponding MEP IDs.

The specific implementation shown in FIG. 3 is illustrated in detail above. One application example applying the specific implementation is given below.

In this application example, nodes A, B, C, and D belong to one MEG, and IP addresses of the nodes A, B, C, and D are 10.1.1.1, 10.1.1.2, 10.1.1.3, and 10.1.1.4 in turn. The node A (source node) and the node D (sink node) are both PE nodes and the nodes B and C are intermediate nodes. A medium access control (MAC) address of the node A is 04-F6-64-D3-64-C7, and an MAC address of the node D is 05-F6-67-F3-64-D6.

Firstly, the node A initiates a PATH signaling carrying OAM property configuration indicating information. The PATH signaling may be a PATH signaling in the process of setting up an ESP or a PATH signaling after the ESP is set up successfully.

OAM property configuration indicating information in the PATH signaling includes the following:

MEG level=4;

MEP collection={10.1.1.1:F8F8; 10.1.1.2:C7C7}, which includes IP addresses of nodes that MEPs belong to and corresponding MEP IDs. The MEP IDs may be managed and allocated by the node A or obtained from the OAM configuration server, as long as the uniqueness in the same MEG is ensured; and MEG ID="China Telecom: ShenzhenToBeijing-200".

In order to indicate a specified path for delivering the PATH signaling, the PATH signaling further includes an explicit route object (ERO) relating to routing information of the specified path: {10.1.1.1, 10.1.1.2, 10.1.1.3, 10.1.1.4}, so as to indicate that the PATH signaling is delivered along the specified path, such that the PATH signaling can flow through the nodes to be configured. Optionally, the PATH signaling may also carry upstream label information for configuring a forwarding table: {MAC:04-F6-64-D3-64-C7, VID:14}.

Secondly, the PATH signaling starts out from the node A, flows through the nodes B and C, and then arrives at the node D. In the process of delivering the PATH signaling, the nodes A, B, C, and D save the OAM property configuration indicating information carried in the PATH signaling flowing through the present node in turn.

After receiving the PATH signaling, the node D initiates a RESV signaling and configures an OAM property of the present node according to the saved OAM property configuration indicating information. Specifically, the node D finds out that the MEP collection in the saved OAM property configuration indicating information contains the IP address of the present node, so it determines that a port on the present node receiving the PATH signaling is an MEP and allocates a corresponding MEP ID to the port. The OAM property configured on the node D specifically includes: port 6 on the present node is an MEP; MEP ID=C7C7; MEG level=4; MEG ID="China Telecom: ShenzhenToBeijing-200"; and peer MEP ID list={F8F8}.

Thirdly, after receiving the RESV signaling, the node C finds out that the MEP collection in the saved OAM property configuration indicating information does not contain the IP address of its own, so it determines that the present node is an intermediate node. Thereby, an OAM property configured for the present node specifically includes: ports 4 and 5 on the present node are MIPs; and MEG level=4.

The case for the node B is similar to that of the node C and will not be described again. The OAM property configured on the node B specifically includes: ports 2 and 3 on the present node are MIPs; and MEG level=4.

Finally, after the RESV signaling is delivered to the node A, the node A configures an OAM property of the present node according to the saved OAM property configuration indicating information: port 1 on the present node is an MEP; MEP ID=F8F8; MEG level=4; MEG ID="ChinaTelecom:ShenzhenToBeijing-200"; and peer MEP ID list={C7C7}.

Additionally, in the process of configuring the OAM property, if a configuration failure occurs, a PATH Err (error) message is returned to the node A, and a RESV Err (error) message is returned to the node D. The PATH Err and RESV Err messages may carry an indication of the OAM property configuration error.

Up to now, the nodes D, C, B, and A have automatically configured the OAM properties of the present node in turn.

It has been mentioned earlier that, the OAM property configuration indicating information in the delivered signaling may not include an IP address of a node each MEP belongs to, and each node determines whether configuration as an MEP is required according to routing information in the signaling; the routing information may be an ERO in the PATH signaling or a Resource ReserVation Protocol_HOP (RSVP_HOP) object in the RESV signaling. Corresponding to this specific application example, the MEP collection only has to include two MEP IDs, in which the first represents an ID of an MEP corresponding to a source node and the second represents an ID of an MEP corresponding to a sink node. Then, the node D can know that the present node is the sink node of the connection according to the ERO information, and thus configures port 6 on the present node as an MEP and allocates the second MEP ID to the MEP. The case for the node A is similar and will not be described again.

Figure 4:
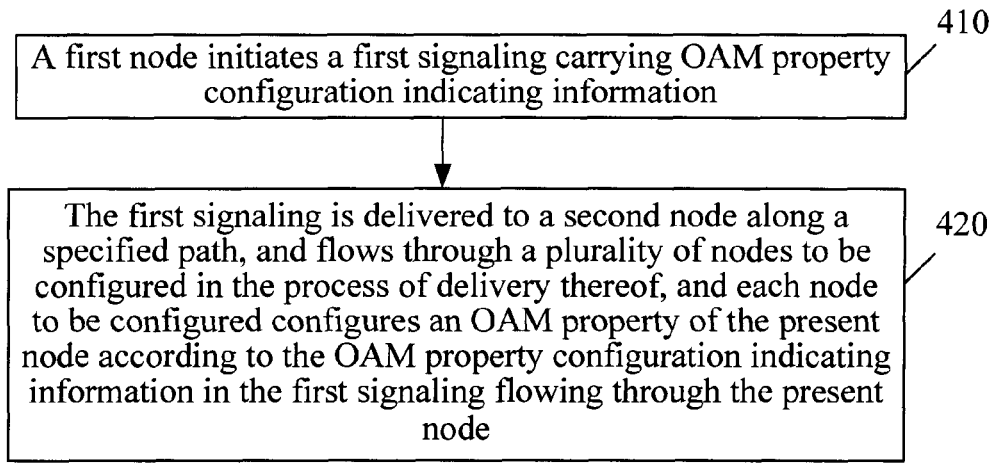
FIG. 4 is a flow chart of a method for configuring OAM properties according to a second embodiment of the present invention.

Referring to FIG. 4, a flow chart of a method for configuring OAM properties according to a second embodiment of the present invention is shown.

In Step 410, a first node initiates a first signaling carrying OAM property configuration indicating information.

In Step 420, the first signaling is delivered to a second node along a specified path, and flows through a plurality of nodes to be configured in the process of delivery thereof, and each node to be configured configures an OAM property of the present node according to the OAM property configuration indicating information in the first signaling flowing through the present node.

Additionally, in the process of configuration, if an OAM property configuration failure occurs, a PATH Err message is returned to the node A. The PATH Err message may carry an indication of the OAM property configuration error.

As can be known from a comparison between the second embodiment and the first embodiment, in the second embodiment, the OAM property of each node is configured in the process of delivering a first signaling carrying the OAM property configuration indicating information, while in the first embodiment, although the OAM property configuration indicating information is carried in a delivered first signaling, each node to be configured does not configure the OAM property immediately; instead, each node first saves the OAM property configuration indicating information carried in the first signaling and then configures the OAM property of the present node according to the previously saved OAM property configuration indicating information when a second signaling is delivered back along an opposite path. For the technical solution in the first embodiment, the first node initiating the first signaling can determine that the configuration of other nodes to be configured have been finished according to the reception of the second signaling, which is equivalent to an acknowledgement process, so that a method for configuring OAM properties having a higher security is provided.

No matter in the first embodiment or the second embodiment, each node to be configured configures an OAM property of the present node according to the OAM property configuration information in the message flowing through the present node, and the difference merely lies in the specific configuration time.

In an embodiment, the present invention further provides a method for configuring OAM properties, which includes the following steps.

A message carrying OAM property configuration indicating information that flows through a present node is processed, and the processing includes receiving the message carrying the OAM property configuration indicating information from a forward node and/or delivering the message carrying the OAM property configuration indicating information to a backward node according to a specified path.

An OAM property of the present node is configured according to the OAM property configuration indicating information.

The method further includes saving the OAM property configuration indicating information in the message flowing through the present node.

If the OAM property configuration indicating information includes universal maintenance information of nodes to be configured and/or distinctive maintenance information of nodes to be configured, the process of configuring the OAM property of the present node according to the OAM property configuration indicating information is as follows.

Distinctive maintenance information corresponding to the present node is configured according to the OAM property configuration indicating information; and/or universal maintenance information required by the present node is configured according to the OAM property configuration indicating information.

If the OAM property configuration indicating information further includes addresses of nodes to be configured which the distinctive maintenance information relates to, the process is as follows.

If the distinctive maintenance information of the nodes to be configured includes IDs of MEPs and the addresses of nodes to be configured which the distinctive maintenance information relates to include addresses of nodes the MEPs belong to, the process of configuring the OAM property of the present node according to the OAM property configuration indicating information further includes the following step.

When the addresses of nodes that the MEPs belong to contain an address of the present node, a port on the present node is configured as an MEP and a corresponding MEP ID is allocated; otherwise, a port on the present node is configured as an MIP.

Alternatively, if the distinctive maintenance information of the nodes to be configured includes IDs of MA endpoints and the addresses of nodes to be configured which the distinctive maintenance information relates to includes addresses of nodes the MA endpoints belong to, the process of configuring the OAM property of the present node according to the OAM property configuration indicating information further includes the following step.

When the addresses of nodes that the MA endpoints belong to contain an address of the present node, a port on the present node is configured as an MA endpoint and a corresponding MA endpoint ID is allocated; otherwise, a port on the present node is configured as an MD intermediate point.

Persons of ordinary skill in the art should understand that all or part of the steps in the methods according to the embodiments of the present invention can be implemented by a program instructing relevant hardware, and the program may be stored in a computer readable storage medium, such as a ROM/RAM, a magnetic disk, or an optical disk.

Figure 5:
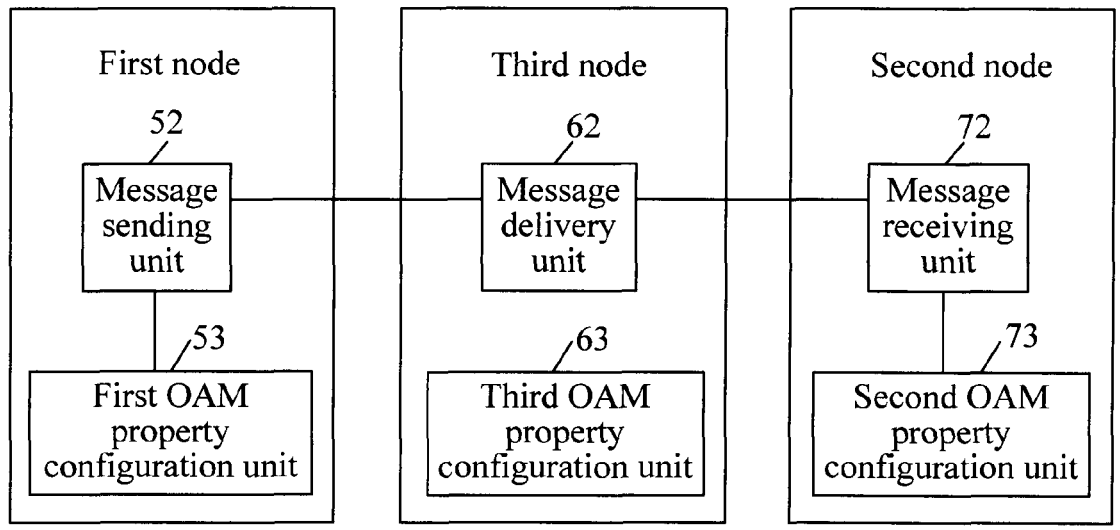
FIG. 5 is a schematic structural view of a system for configuring OAM properties according to an embodiment of the present invention.

The present invention further provides a system for configuring OAM properties. FIG. 5 is a schematic structural view of the system for configuring OAM properties according to an embodiment of the present invention. The system in this embodiment includes a plurality of nodes to be configured. A message carrying OAM property configuration indicating information flows through the plurality of nodes to be configured in turn. Each of the nodes to be configured is adapted to configure an OAM property of the present node according to the OAM property configuration indicating information in the message flowing through the present node.

Specifically, the system in this embodiment includes a plurality of nodes to be configured, namely, a first node serving as a source node, a third node serving as an intermediate node (a plurality of intermediate node may exist), and a second node serving as a sink node. A message carrying OAM property configuration indicating information flows through the first node, the second node, and the third node in turn. A specified path for delivering the message carrying the OAM property configuration indicating information is from the first node to the third node and then to the second node.

The first node includes a message sending unit 52 and a first OAM property configuration unit 53. Particularly, the message sending unit 52 may have multiple specific implementations.

For example, the message sending unit 52 specifically includes a first information requesting unit and a first sending unit. The first information requesting unit is configured to send an OAM_Configuration_Request to an OAM property configuration server and receive OAM property configuration indicating information as a reply of the OAM property configuration server. The first sending unit is configured to deliver a message carrying the OAM property configuration indicating information provided by the first information requesting unit to a backward node according to the specified path.

For another example, the OAM property configuration indicating information includes universal maintenance information of the nodes to be configured and distinctive maintenance information of the nodes to be configured. The message sending unit 52 specifically includes a second information requesting unit, a distinctive maintenance information allocation unit, and a second sending unit. The second information requesting unit is configured to send an OAM_Configuration_Request to an OAM property configuration server and receive the universal maintenance information of the nodes to be configured as a feedback of the OAM property configuration server. The distinctive maintenance information allocation unit is configured to allocate the distinctive maintenance information of the nodes to be configured. The second sending unit is specifically configured to deliver a message carrying the universal maintenance information of the nodes to be configured provided by the second information requesting unit and the distinctive maintenance information provided by the distinctive maintenance information allocation unit to a backward node according to the specified path.

The first OAM property configuration unit 53 configures an OAM property of the present node according to the OAM property configuration indicating information provided by the message sending unit 52. In this embodiment, the backward node of the first node is the third node.

Then, a message delivery unit 62 of the third node receives the message carrying the OAM property configuration indicating information from a forward node (the first node). Moreover, a third OAM property configuration unit 63 configures an OAM property of the present node according to the OAM property configuration indicating information in the message. In addition, the message delivery unit 62 further continues to deliver the message carrying the OAM property configuration indicating information to a backward node (the second node) according to the specified path.

After a message receiving unit 72 of the second node receives the message carrying the OAM property configuration indicating information delivered down from the third node, a second OAM property configuration unit 73 configures an OAM property of the present node according to the OAM property configuration indicating information in the message.

It should be noted that, in special cases, the nodes to be configured may include only the source node (the first node) and the sink node (the second node) in the process of delivering the message carrying the OAM property configuration indicating information but not include the intermediate node (the third node) in the process of delivering the message; or the nodes to be configured include only the intermediate nodes (for example, a plurality of third nodes) but do not include the source node and the sink node. Certainly, in general cases, the nodes to be configured include not only the source node and the sink node in the process of delivering the message carrying the OAM property configuration indicating information but also the intermediate node in the process of delivering the message. The plurality of nodes to be configured may belong to the same connection or different connections.

It has been mentioned earlier that, the OAM property of each node may not be configured in the process of delivering a first signaling carrying OAM property configuration indicating information; instead, the OAM property configuration indicating information carried in the first signaling is saved first, and then, the OAM property of each node is configured according to the previously saved OAM property configuration indicating information in the process of returning a second signaling from the second node. In this case, each node further needs to include a storage unit configured to save the OAM property configuration indicating information carried in the first signaling that flows through the present node. Then, after each node receives the second signaling, the OAM property configuration unit in each node configures the OAM property of the present node according to the OAM property configuration indicating information saved by the storage unit.

Persons skilled in the art should understand that, although the OAM property configuration indicating information is carried by a PATH signaling in the above specific embodiments, the actual application is not limited thereto, and the OAM property configuration indicating information required to be delivered to each node to be configured may also be carried by other messages.

Figure 6:
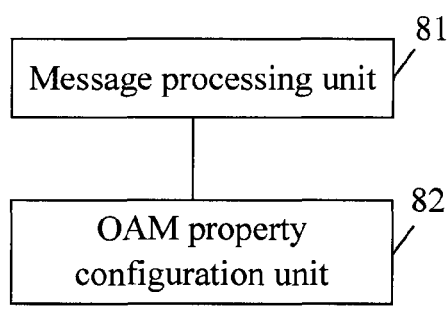
FIG. 6 is a schematic structural view of a node device for configuring OAM properties according to an embodiment of the present invention.

The present invention further provides a node device for configuring OAM properties according to an embodiment. FIG. 6 is a schematic structural view of a node device for configuring OAM properties according to an embodiment of the present invention. The node device in this embodiment includes a message processing unit 81 and an OAM property configuration unit 82. The internal constitution and connection relationship of the node device are introduced further below in combination with operating principles thereof.

The message processing unit 81 is configured to process a message carrying OAM property configuration indicating information, and the processing includes receiving the message carrying the OAM property configuration indicating information from a forward node and/or delivering the message carrying the OAM property configuration indicating information to a backward node according to a specified path. It can be seen that, if the node device is located at a position of the first node in FIG. 5, the message processing unit 81 is configured to only deliver the message carrying the OAM property configuration indicating information to a backward node according to the specified path; if the node device is located at a position of the second node in FIG. 5, the message processing unit 81 is configured to only receive the message carrying the OAM property configuration indicating information from a forward node; if the node device is located at a position of the third node in FIG. 5, the message processing unit 81 needs to not only receive the message carrying the OAM property configuration indicating information from a forward node but also continue to deliver the message to a backward node according to the specified path.

The OAM property configuration unit 82 is configured to configure an OAM property of a present node according to the OAM property configuration indicating information in the message flowing through the present node. Specifically, the OAM property configuration indicating information in the message includes universal maintenance information of the nodes to be configured and distinctive maintenance information of the nodes to be configured. Then, the OAM property configuration unit 82 specifically includes: a distinctive maintenance information configuration unit configured to configure distinctive maintenance information corresponding to the present node according to the OAM property configuration indicating information in the message; and a universal maintenance information configuration unit configured to configure universal maintenance information required by the present node according to the OAM property configuration indicating information in the message.

Optionally, in addition to the universal maintenance information and the distinctive maintenance information, the OAM property configuration indicating information further includes addresses of nodes which the distinctive maintenance information relates to.

For example, the distinctive maintenance information of the nodes to be configured includes IDs of MEPs, and the addresses of nodes to be configured which the distinctive maintenance information relates to include addresses of nodes that the MEPs belong to. Then, the distinctive maintenance information configuration unit is specifically configured to configure a port on the present node as an MEP and allocates a corresponding MEP ID when the addresses of nodes that the MEPs belong to contain an address of the present node; otherwise, configure a port on the present node as an MIP.

For another example, the distinctive maintenance information of the nodes to be configured includes IDs of MA endpoints, and the addresses of nodes to be configured which the distinctive maintenance information relates to include addresses of nodes that the MA endpoints belong to. Then, the distinctive maintenance information configuration unit is specifically configured to configure a port on the present node as an MA endpoint and allocates a corresponding MA endpoint ID when the addresses of nodes that the MA endpoints belong to contain an address of the present node; otherwise, configure a port on the present node as an MD intermediate point.

Similar to the storage unit in the system according to the embodiment, optionally, the node device in this embodiment may also include a storage unit configured to save the OAM property configuration indicating information carried in the message flowing through the present node. Then, the OAM property configuration unit is specifically configured to configure the OAM property of the present node according to the OAM property configuration indicating information saved by the storage unit.

The above-described embodiments of the present invention are not intended to limit the protection scope of the present invention. Any modification, equivalent replacement, and improvement made without departing from the spirit and principle of the present invention shall fall within the protection scope of the claims of the invention.

What is claimed is:

1. A method for configuring operation, administration and maintenance (OAM) properties, comprising:
   delivering a message carrying OAM property configuration indicating information; and
   flowing through a plurality of nodes to be configured in the process of delivering the message, and configuring, by each of the nodes to be configured, an OAM property of a present node according to the OAM property configuration indicating information in the message flowing through the present node;
   wherein the OAM property configuration indicating information in the message comprises: universal maintenance information of the nodes to be configured and distinctive maintenance information of the nodes to be configured; and
   the configuring, by each of the nodes to be configured, the OAM property of the present node according to the OAM property configuration indicating information in the message flowing through the present node comprises: configuring, by each of the nodes to be configured, distinctive maintenance information corresponding to the present node and universal maintenance information required by the present node according to the OAM property configuration indicating information in the message flowing through the present node;
   wherein the OAM property configuration indicating information in the message further comprises addresses of nodes to be configured which the distinctive maintenance information relates to;
   the distinctive maintenance information of the nodes to be configured comprises identifiers (IDs) of maintenance entity group (MEG) endpoints (MEPs), and the addresses of the nodes to be configured which the distinctive maintenance information relates to comprise addresses of nodes that the MEPs belong to; and the configuring the distinctive maintenance information corresponding to the present node according to the OAM property configuration indicating information in the message flowing through the present node comprises: if the addresses of the nodes that the MEPs belong to in the message flowing through the present node comprise an address of the present node, configuring a port on the present node as an MEP and configuring a corresponding MEP ID.

2. The method according to claim 1, wherein the delivering the message carrying the OAM property configuration indicating information comprises: initiating, by a first node, a first signaling carrying the OAM property configuration indicating information, and delivering the first signaling to a second node along a specified path; and initiating, by the second node, a second signaling after receiving the first signaling, and delivering the second signaling to the first node in a direction opposite to the delivery path of the first signaling; and the method further comprises:
saving, by each of the nodes to be configured, the OAM property configuration indicating information in the first signaling flowing through the present node in the process of delivering the first signaling.

3. The method according to claim 2, wherein the configuring, by each of the nodes to be configured, the OAM property of the present node according to the OAM property configuration indicating information in the message flowing through the present node comprises:

configuring, by each of the nodes to be configured, the OAM property of the present node according to the OAM property configuration indicating information saved by the present node when the second signaling flows through the present node.

4. The method according to claim 1, wherein
the delivering the message carrying the OAM property configuration indicating information comprises: initiating, by a first node, a first signaling carrying the OAM property configuration indicating information, and delivering the first signaling to a second node along a specified path; and
the configuring, by each of the nodes to be configured, the OAM property of the present node according to the OAM property configuration indicating information in the message flowing through the present node comprises: configuring, by each of the nodes to be configured, the OAM property of the present node according to OAM property configuration indicating information in the first signaling flowing through the present node.

5. The method according to claim 1, wherein the universal maintenance information of the nodes to be configured comprises an MEG level.

6. The method according to claim 1, wherein
the configuring the distinctive maintenance information corresponding to the present node according to the OAM property configuration indicating information in the message flowing through the present node further comprises:
if the addresses of the nodes that the MEPs belong to in the message flowing through the present node do not comprise the address of the present node, configuring a port on the present node as an MEG intermediate point (MIP).

7. The method according to claim 2 wherein before the message carrying the OAM property configuration indicating information is delivered, the method further comprises: setting up an Ethernet switching path (ESP) on the specified path; and
a successful setup of the ESP triggers the delivery of the message carrying the OAM property configuration indicating information along the specified path.

8. A system for configuring operation, administration and maintenance (OAM) properties, comprising: a plurality of nodes to be configured, wherein a message carrying OAM property configuration indicating information flows through the plurality of nodes to be configured in turn; and
each of the nodes to be configured is configured to configure an OAM property of a present node according to the OAM property configuration indicating information in the message flowing through the present node;
wherein when the node to be configured is a source node that the message carrying the OAM property configuration indicating information flows through, the node to be configured comprises:
a message sending unit, configured to deliver the message carrying the OAM property configuration indicating information to a backward node according to a specified path; and
an OAM property configuration unit, configured to configure an OAM property of the resent node according to the OAM property configuration indicatin information;
wherein the OAM property configuration indicating information in the message comprises: universal maintenance information of the nodes to be configured and distinctive maintenance information of the nodes to be configured, and the message sending unit comprises:
an information requesting unit, configured to send an OAM_Configuration_Request to an OAM property configuration server and receive the universal maintenance information of the nodes to be configured as a feedback of the OAM property configuration server;
a distinctive maintenance information allocation unit, configured to allocate the distinctive maintenance information of the nodes to be configured; and
a sending unit, configured to deliver the message carrying the universal maintenance information of the nodes to be configured provided by the information requesting unit and the distinctive maintenance information provided by the distinctive maintenance information allocation unit to a backward node adjacent to the present node according to the specified path.

9. The system according to claim 8, wherein the node to be configured further comprises:
a storage unit, configured to save the OAM property configuration indicating information in the message flowing through the present node; wherein,
the OAM property configuration unit is configured to configure the OAM property of the present node according to the OAM property configuration indicating information saved by the storage unit.

10. A node device for configuring operation, administration and maintenance (OAM) properties, comprising:
a message processing unit, configured to deliver a message carrying the OAM property configuration indicating information to a backward node and
an OAM property configuration unit, configured to configure an OAM property of a present node according to the OAM property configuration indicating information;
wherein the OAM property configuration indicating information comprises: universal maintenance information of nodes to be configured and distinctive maintenance information of the nodes to be configured;

the OAM property configuration unit comprises:
a distinctive maintenance information configuration unit, configured to configure distinctive maintenance information corresponding to the present node according to the OAM property configuration indicating information; and
a universal maintenance information configuration unit, configured to configure universal maintenance information required by the present node according to the OAM property configuration indicating information;
wherein the OAM property configuration indicating information further comprises addresses of nodes to be configured which the distinctive maintenance information relates to;
the distinctive maintenance information of the nodes to be configured comprises identifiers (IDs) of maintenance entity group (MEG) endpoints (MEPs), and the addresses of the nodes to be configured which the distinctive maintenance information relates to comprise addresses of nodes that the MEPs belong to; and
the distinctive maintenance information configuration unit is configured to configure a port on the present node as an MEP and allocate a corresponding MEP ID when the addresses of the nodes that the MEPs belong to comprise an address of the present node.

11. A method for configuring operation, administration and maintenance (OAM) properties, comprising:
delivering a message carrying OAM property configuration indicating information; and
flowing through a plurality of nodes to be configured in the process of delivering the message, and configuring, by each of the nodes to be configured, an OAM property of a present node according to the OAM property configuration indicating information in the message flowing through the present node;
wherein the OAM property configuration indicating information in the message comprises: universal maintenance information of the nodes to be configured and distinctive maintenance information of the nodes to be configured; and
the configuring, by each of the nodes to be configured, the OAM property of the present node according to the OAM property configuration indicating information in the message flowing through the present node comprises: configuring, by each of the nodes to be configured, distinctive maintenance information corresponding to the present node and universal maintenance information required by the present node according to the OAM property configuration indicating information in the message flowing through the present node;
wherein the OAM property configuration indicating information in the message further comprises addresses of nodes to be configured which the distinctive maintenance information relates to;
the distinctive maintenance information of the nodes to be configured comprises IDs of maintenance association (MA) endpoints, and the addresses of the nodes to be configured which the distinctive maintenance information relates to comprise addresses of nodes that the MA endpoints belong to; and
the configuring the distinctive maintenance information corresponding to the present node according to the OAM property configuration indicating information in the message flowing through the present node comprises: if the addresses of the nodes that the MA endpoints belong to in the message flowing through the present node comprise an address of the present node, configuring a port on the present node as an MA endpoint and configuring a corresponding MA endpoint ID.

12. The method according to claim 11, wherein the universal maintenance information of the nodes to be configured comprises a maintenance domain (MD) level.

13. The method according to claim 11, wherein
the configuring the distinctive maintenance information corresponding to the present node according to the OAM property configuration indicating information in the message flowing through the present node further comprises:
if the addresses of the nodes that the MA endpoints belong to in the message flowing through the present node do not comprise the address of the present node, configuring a port on the present node as a maintenance domain (MD) intermediate point.

14. A node device for configuring operation, administration and maintenance (OAM) properties, comprising:
a message processing unit, configured to receive the message carrying the OAM property configuration indicating information from a forward node; and
an OAM property configuration unit, configured to configure an OAM property of a present node according to the OAM property configuration indicating information;
wherein the OAM property configuration indicating information comprises: universal maintenance information of nodes to be configured and distinctive maintenance information of the nodes to be configured;
the OAM property configuration unit comprises:
a distinctive maintenance information configuration unit, configured to configure distinctive maintenance information corresponding to the present node according to the OAM property configuration indicating information; and
a universal maintenance information configuration unit, configured to configure universal maintenance information required by the present node according to the OAM property configuration indicating information;
wherein the OAM property configuration indicating information further comprises addresses of nodes to be configured which the distinctive maintenance information relates to;
the distinctive maintenance information of the nodes to be configured comprises identifiers (IDs) of maintenance entity group (MEG) endpoints (MEPs), and the addresses of the nodes to be configured which the distinctive maintenance information relates to comprise addresses of nodes that the MEPs belong to; and
the distinctive maintenance information configuration unit is configured to configure a port on the present node as an MEP and allocate a corresponding MEP ID when the addresses of the nodes that the MEPs belong to comprise an address of the present node.

15. A node device for configuring operation, administration and maintenance (OAM) properties, comprising:
a message processing unit, configured to deliver the message carrying the OAM property configuration indicating information to a backward node; and
an OAM property configuration unit, configured to configure an OAM property of a present node according to the OAM property configuration indicating information;
wherein the OAM property configuration indicating information comprises: universal maintenance information of nodes to be configured and distinctive maintenance information of the nodes to be configured;

the OAM property configuration unit comprises:
a distinctive maintenance information configuration unit, configured to configure distinctive maintenance information corresponding to the present node according to the OAM property configuration indicating information; and
a universal maintenance information configuration unit, configured to configure universal maintenance information required by the present node according to the OAM property configuration indicating information;
wherein the OAM property configuration indicating information further comprises addresses of nodes to be configured which the distinctive maintenance information relates to;
the distinctive maintenance information of the nodes to be configured comprises IDs of maintenance association (MA) endpoints, and the addresses of the nodes to be configured which the distinctive maintenance information relates to comprise addresses of nodes that the MA endpoints belong to; and
the distinctive maintenance information configuration unit is configured to configure a port on the present node as an MA endpoint and allocate a corresponding MA endpoint ID when the addresses of the nodes that the MA endpoints belong to comprise an address of the present node.

16. A node device for configuring operation, administration and maintenance (OAM) properties, comprising:
a message processing unit, configured to receive the message carrying the OAM property configuration indicating information from a forward node; and
an OAM property configuration unit, configured to configure an OAM property of a present node according to the OAM property configuration indicating information;
wherein the OAM property configuration indicating information comprises: universal maintenance information of nodes to be configured and distinctive maintenance information of the nodes to be configured;
the OAM property configuration unit comprises:
a distinctive maintenance information configuration unit, configured to configure distinctive maintenance information corresponding to the present node according to the OAM property configuration indicating information; and
a universal maintenance information configuration unit, configured to configure universal maintenance information required by the present node according to the OAM property configuration indicating information;
wherein the OAM property configuration indicating information further comprises addresses of nodes to be configured which the distinctive maintenance information relates to;
the distinctive maintenance information of the nodes to be configured comprises IDs of maintenance association (MA) endpoints, and the addresses of the nodes to be configured which the distinctive maintenance information relates to comprise addresses of nodes that the MA endpoints belong to; and
the distinctive maintenance information configuration unit is configured to configure a port on the present node as an MA endpoint and allocate a corresponding MA endpoint ID when the addresses of the nodes that the MA endpoints belong to comprise an address of the present node.

* * * * *

UNITED STATES PATENT AND TRADEMARK OFFICE
CERTIFICATE OF CORRECTION

| | | |
|---|---|---|
| PATENT NO. | : 8,310,939 B2 | |
| APPLICATION NO. | : 12/690212 | |
| DATED | : November 13, 2012 | |
| INVENTOR(S) | : Hao Long et al. | |

It is certified that error appears in the above-identified patent and that said Letters Patent is hereby corrected as shown below:

On the cover page, under item (75) Inventors, the third listed inventor "Don Li" should read -- Dan Li --

In claim 8, column 16, line 25, "resent" should read -- present --

In claim 8, column 16, line 26, "indicatin" should read -- indicating --

Signed and Sealed this
Twenty-second Day of January, 2013

David J. Kappos
*Director of the United States Patent and Trademark Office*